(12) United States Patent
Ishisako

(10) Patent No.: US 9,776,535 B2
(45) Date of Patent: Oct. 3, 2017

(54) INFANT RESTRAINT SYSTEM

(71) Applicant: Nihon Ikuji Co., Ltd., Osaka-shi, Osaka (JP)

(72) Inventor: Ritsusou Ishisako, Nishinomiya (JP)

(73) Assignee: Nihon Ikuji Co., LTD, Osaka-shi, Osaka (JP)

( * ) Notice: Subject to any disclaimer, the term of this patent is extended or adjusted under 35 U.S.C. 154(b) by 231 days.

(21) Appl. No.: 14/368,497

(22) PCT Filed: Mar. 27, 2014

(86) PCT No.: PCT/JP2014/001804
§ 371 (c)(1),
(2) Date: Jun. 24, 2014

(87) PCT Pub. No.: WO2014/171079
PCT Pub. Date: Oct. 23, 2014

(65) Prior Publication Data
US 2014/0346826 A1  Nov. 27, 2014

(30) Foreign Application Priority Data

Apr. 17, 2013 (JP) .................................. 2013-086513

(51) Int. Cl.
*B60N 2/28* (2006.01)
*B60R 22/10* (2006.01)
(Continued)

(52) U.S. Cl.
CPC ........... *B60N 2/2872* (2013.01); *B60N 2/265* (2013.01); *B60N 2/286* (2013.01); *B60N 2/2806* (2013.01);
(Continued)

(58) Field of Classification Search
None
See application file for complete search history.

(56) References Cited

U.S. PATENT DOCUMENTS 4,655,503 A * 4/1987 Kamijo .................. B60N 2/203
297/103
5,280,995 A * 1/1994 Elton ................... B60N 2/3084
280/807
(Continued)

FOREIGN PATENT DOCUMENTS

CN 101048092 A 10/2007
CN 102343846 A 2/2012
(Continued)

OTHER PUBLICATIONS

ISA Japanese Patent Office, International Search Report of PCT/JP2014/001804, WIPO, Apr. 28, 2014, 2 pages.
(Continued)

*Primary Examiner* — David E Allred
(74) *Attorney, Agent, or Firm* — Alleman Hall Creasman & Tuttle LLP

(57) ABSTRACT

An infant restraint system includes: a back rest portion; a seat portion connected to a lower portion of the back rest portion swingably between an in-use and storage position; upper side position regulating portions formed on a left and right portion of an upper portion of the back rest surface; lower side position regulating portions formed on a left portion and a right portion of the back rest surface at a position below the upper side position regulating portions; an upper body belt portion which includes the pair of shoulder belts and a pair of tongue plates attached to the pair of shoulder belts; a side guard portion respectively extending frontward from a left edge portion and a right edge portion of a lower portion of the back rest portion; and a crotch belt portion having a buckle body which is detachably engaged with the pair of tongue plates.

2 Claims, 5 Drawing Sheets

(51) Int. Cl.
   *B60N 2/42* (2006.01)
   *B60N 2/26* (2006.01)
(52) U.S. Cl.
   CPC ......... *B60N 2/2812* (2013.01); *B60N 2/2839* (2013.01); *B60N 2/2851* (2013.01); *B60N 2/2866* (2013.01); *B60N 2/2878* (2013.01); *B60N 2/4235* (2013.01); *B60R 22/105* (2013.01); *B60N 2002/2815* (2013.01); *B60N 2002/2818* (2013.01); *B60N 2002/2896* (2013.01)

(56) References Cited

U.S. PATENT DOCUMENTS

| | | | | |
|---|---|---|---|---|
| 5,332,284 | A * | 7/1994 | Elton | B60N 2/3084 297/238 |
| 5,529,381 | A * | 6/1996 | Zhao | B60R 22/3405 297/238 |
| 5,568,959 | A * | 10/1996 | Weber | B60N 2/4613 297/238 |
| 5,845,968 | A * | 12/1998 | Lovie | B60N 2/2803 297/250.1 |
| 6,474,732 | B1 * | 11/2002 | Merensky | B60N 2/26 297/14 |
| 7,188,899 | B1 * | 3/2007 | McClellan-Derrickson | B60N 2/2806 297/188.06 |
| 7,488,038 | B2 * | 2/2009 | Boyle | B60N 2/2806 297/250.1 |
| 8,152,236 | B1 * | 4/2012 | Romero | A47D 1/10 297/16.1 |
| 9,108,543 | B1 * | 8/2015 | Knapp | B60N 2/2875 |
| 9,428,088 | B1 * | 8/2016 | Rajasingham | B60N 2/427 |
| 2003/0090134 | A1 * | 5/2003 | James | B60N 2/2812 297/250.1 |
| 2008/0018152 | A1 * | 1/2008 | Vadai | B60N 2/0284 297/255 |
| 2008/0224514 | A1 * | 9/2008 | Zink | B60N 2/2851 297/255 |

FOREIGN PATENT DOCUMENTS

| | | |
|---|---|---|
| JP | 2001063417 A | 3/2001 |
| JP | 2005162151 A | 6/2005 |
| JP | 2007196713 A | 8/2007 |
| JP | 2007528315 A | 10/2007 |

OTHER PUBLICATIONS

State Intellectual Property Office of the People's Republic of China, Office Action and Search Report Issued in Application No. 201480000319.2, Aug. 29, 2016, 8 pages. (Submitted with Translation of Search Report).

* cited by examiner

INFANT RESTRAINT SYSTEM

TECHNICAL FIELD

The present invention relates to an infant restraint system mounted on a vehicle seat.

BACKGROUND ART

Conventionally known is a foldable child seat (see Patent Literature 1, for example).

The child seat includes a seat body having a seat surface portion and a back support portion, and a belt. The seat surface portion and the back support portion are joined to each other at a joint portion, and the seat body is foldable at the joint portion. Accordingly, in a non-use state, by folding the seat body, it is unnecessary to provide a large space for storing the child seat.

CITATION LIST

Patent Literature

PTL 1: JP 2001-63417 A

SUMMARY OF INVENTION

Technical Problem

Recently, an infant restraint system including a child seat is required to take measures to protect an infant from an impact on the infant restraint system from a side when a side collision accident occurs, for example.

However, the child seat described in Patent Literature 1 has a drawback that the child seat cannot sufficiently protect an infant from an impact coming from a side.

Solution to Problem

In order to solve the above problems, an infant restraint system according to one aspect of the present invention is an infant restraint system which is mounted on a vehicle seat having a seat portion and a back portion, the infant restraint system including: a back rest portion disposed along the back portion of the vehicle seat and having a back rest surface which extends in a vertical direction; the seat portion being configured such that the seat portion is connected to a lower portion of the back rest portion swingably between an in-use position and a storage position, extends toward a front side of the back rest surface at the in-use position, and extends along the back rest surface behind the back rest surface at the storage position; upper side position regulating portions for regulating upper side positions of a pair of shoulder belts, the upper side position regulating portions being formed on a left portion and a right portion of an upper portion of the back rest surface respectively; lower side position regulating portions for regulating lower side positions of the pair of shoulder belts, the lower side position regulating portions being formed on a left portion and a right portion of the back rest surface at a position below the upper side position regulating portions respectively or a left portion and a right portion of the seat portion respectively; an upper body belt portion which includes the pair of shoulder belts extending from the upper side position regulating portions to the lower side position regulating portions, and a pair of tongue plates which are respectively attached to the pair of shoulder belts in a state where the pair of shoulder belts are allowed to pass through the pair of tongue plates, respectively; a side guard portion extending frontward from a left edge portion and a right edge portion of a lower portion of the back rest portion; and a crotch belt portion extending from a crotch belt mounting portion mounted on a center portion of a front edge portion of the seat portion, and having a buckle body which is detachably engaged with the pair of tongue plates on a distal end portion thereof.

Due to such a configuration, for example, when an impact is applied to the infant restraint system from a side when a side collision accident occurs so that a body of an infant is almost thrown out sideways, the side guard portion supports a waist of the infant and hence, it is possible to prevent the body of the infant from being thrown out sideways. Accordingly, it is possible to protect the infant from the impact applied from the side.

Further, by positioning the seat portion at the storage position, a storing space for storing the infant restraint system removed from the vehicle seat can be saved and, at the same time, the infant restraint system is also advantageous in portability.

The seat portion may have a rear edge portion thereof swingably connected to a lower portion of the back rest portion about a rotational axis extending in a left/right direction, and the side guard portion may be disposed above the seat portion positioned at the in-use position and on an imaginary rotational trajectory of the seat portion which rotates about the rotational axis.

Due to such a configuration, when the back rest portion rotates frontward in a state where the infant restraint system is mounted on the vehicle seat, the side guard portion is brought into contact with the seat portion and hence, the rotation of the back rest portion is restricted by the side guard portion. Accordingly, it is possible to prevent the occurrence of a case where the infant restraint system becomes folded when a head-on collision accident occurs so that an infant is sandwiched between the back rest portion and the seat portion, for example.

A length of at least one of the upper body belt portion and the crotch belt portion is configured to be adjustable to a size at which an infant who is seated on the seat portion of the vehicle seat so as to extend the crotch belt portion under his or her crotch and has his or her arms passing through the upper body belt portion is restrained by making the pair of tongue plates of the upper body belt portion and the buckle body of the crotch belt portion engage with each other.

Due to such a configuration, the infant restraint system can properly restrain an infant seated on the seat portion of the vehicle seat.

Advantageous Effects of Invention

In accordance with the infant restraint system of the present invention, it is possible to acquire an advantageous effect that an infant can be protected from an impact coming from a side when a side collision accident occurs or the like.

DESCRIPTION OF EMBODIMENTS

Hereinafter, one embodiment of the present invention will be described with reference to the drawings. Note that, the present invention is not limited to the embodiment. Further, hereinafter, identical or corresponding elements will be given the same reference numbers in all drawings, and redundant description thereof will not be repeated.

Embodiment

[Configuration]

As described later, an infant restraint system 100 is mounted on a vehicle seat 110 which is directed frontward in a travel direction of a vehicle (see FIG. 4), for example. In this embodiment, the vehicle seat 110 is a seat of an passenger automobile, for example.

In the description made hereinafter, for the sake of convenience, a side to which the vehicle seat 110 is directed may also be referred to as a front side, and a side opposite to the front side may be also referred to as a rear side.

Figure 1:
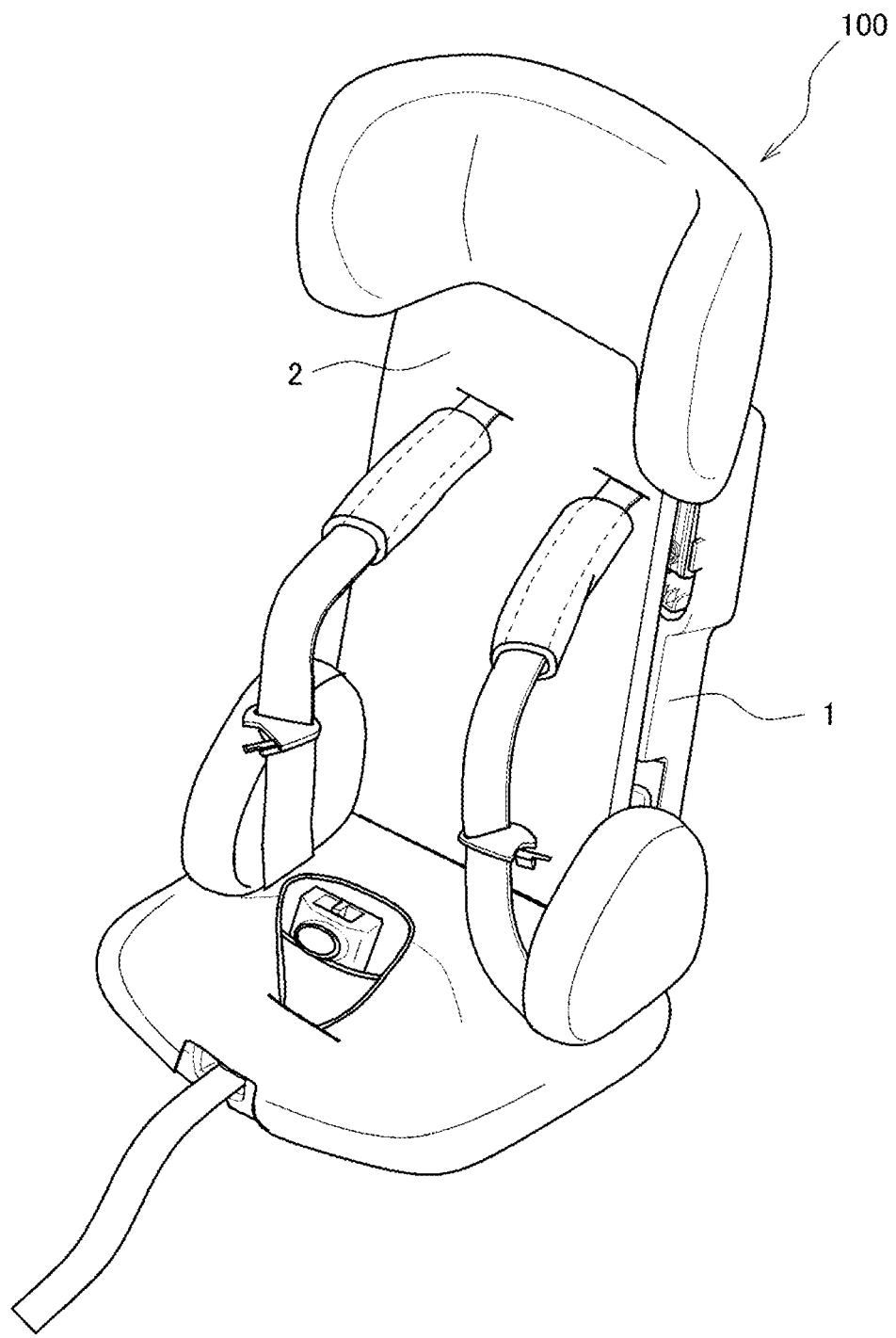
FIG. 1 is a perspective view showing a configuration example of an infant restraint system according to an embodiment of the present invention.

FIG. 1 is a perspective view showing a configuration example of the infant restraint system 100.

The infant restraint system 100 includes, as shown in FIG. 1, an infant restraint system body 1, and a cover 2 which covers the infant restraint system body 1.

The cover 2 is configured to function as a cushion between an infant restrained by the infant restraint system 100 and the infant restraint system body 1. The cover 2 is configured to cover a seat portion 9, a back rest portion 10, a head rest portion 11, and a side guard portion 14, which will be described later (see FIG. 2). The cover 2 is formed such that the cover 2 is mounted on or is removed from the infant restraint system body 1. The cover 2 is provided with insertion holes, not shown, through which shoulder belts 30 and a crotch belt portion 13 (see FIG. 2), which will be described later, pass.

Figure 2:
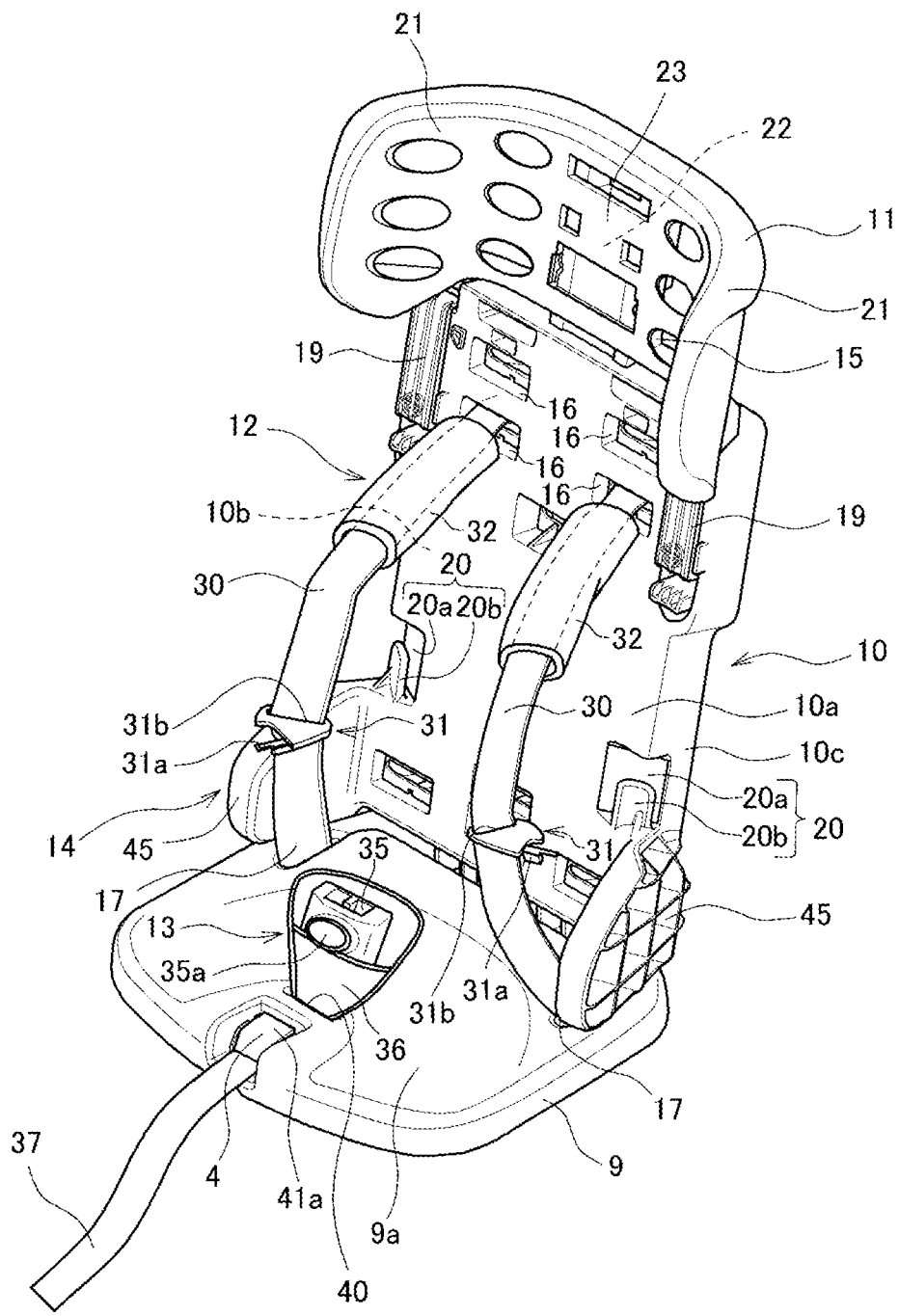
FIG. 2 is a perspective view showing the configuration example of the infant restraint system shown in FIG. 1 in a state where a cover is removed from the infant restraint system.
Figure 3:
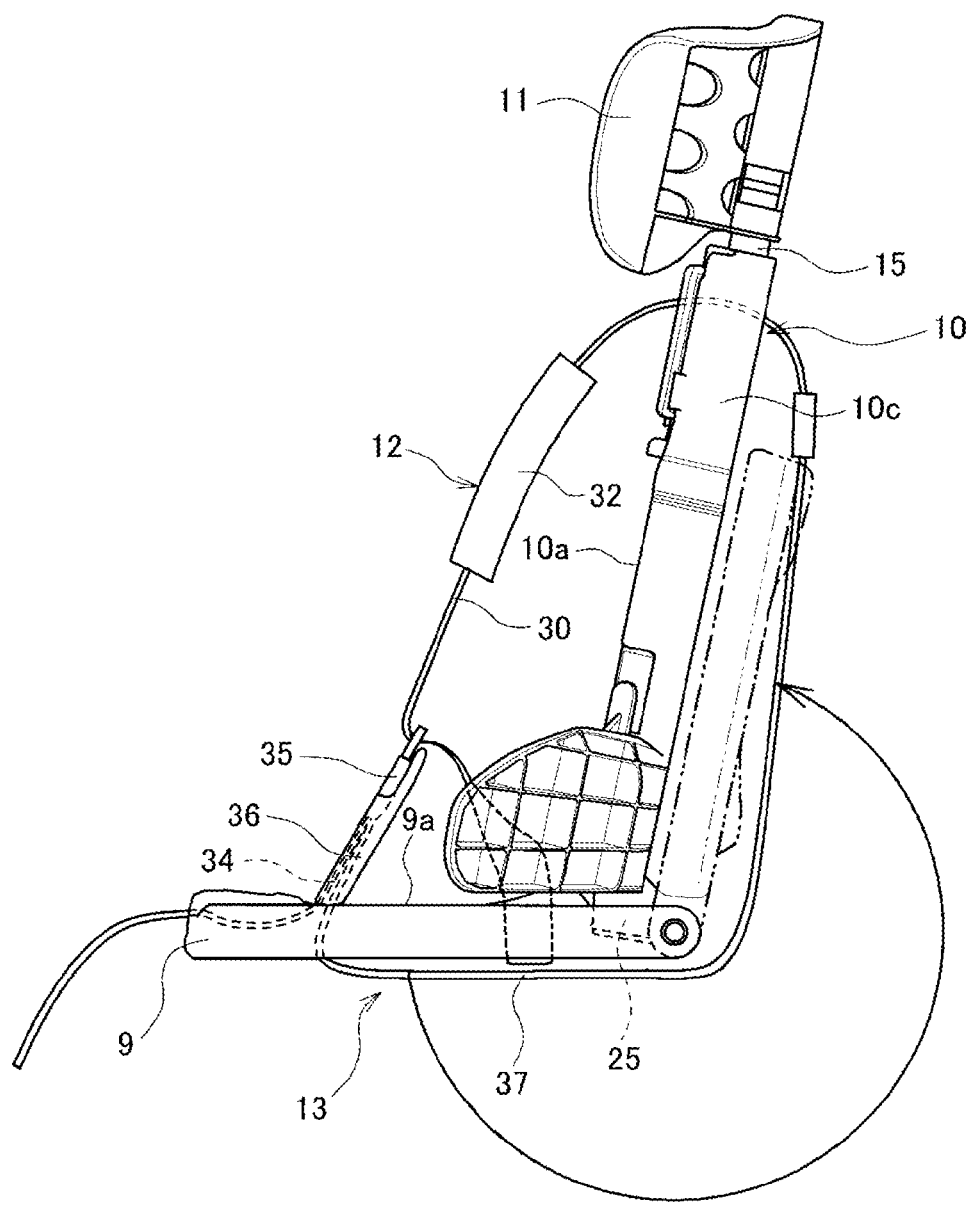
FIG. 3 is a side view showing the configuration example of the infant restraint system shown in FIG. 1 in a state where the cover is removed from the infant restraint system.

FIG. 2 is a perspective view showing the infant restraint system 100 in a state where the cover 2 is removed from the infant restraint system 100. FIG. 3 is a side view showing the infant restraint system 100 in a state where the cover 2 is removed from the infant restraint system 100.

The infant restraint system body 1 includes, as shown in FIG. 2, the back rest portion 10, the seat portion 9, the head rest portion 11, an upper body belt portion 12, the crotch belt portion 13, and side guard portion 14.

The back rest portion 10 is formed into a rectangular flat plate shape having a predetermined thickness, for example. The back rest portion 10 is disposed along a back portion 112 of the vehicle seat 110 in an in-use state (see FIG. 4). The back rest portion 10 includes a back rest surface 10a extending in the up/down direction, and a peripheral surface extending rearward from a periphery of the back rest surface 10a. In the back rest portion 10 having such a configuration, a portion extending rearward from a left side edge of the back rest surface 10a when the back rest portion 10 is viewed from a front side in an in-use state forms a left side surface 10b, and a portion extending rearward from a right side edge of the back rest surface 10a when the back rest portion 10 is viewed from a front side in an in-use state forms a right side surface 10c. Hereinafter, a side on which the left side surface 10b of the back rest portion 10 is positioned may also be simply referred to as a left side, and a side on which the right side surface 10c is positioned may also be simply referred to as a right side.

Here, the back rest portion 10 includes shoulder belt upper side mounting portions 16 formed on the back rest surface 10a, seat belt engaging portions 19 for engaging with seat belt 114 of the vehicle seat 110, and seat belt latching portions 20.

In this embodiment, the shoulder belt upper side mounting portions 16 are holes formed on the back rest surface 10a. However, the present invention is not limited to such a configuration.

The shoulder belt upper side mounting portions 16 are formed on a left portion and a right portion of an upper portion of the back rest surface 10a respectively, and these left and right shoulder belt upper side mounting portions 16 configure upper side position regulating portions which regulate upper side positions of a pair of shoulder belts 30 described later. In this embodiment, for example, two pairs of shoulder belt upper side mounting portions 16 are formed such that each pair of shoulder belt upper side mounting portions 16 are disposed parallel to each other in the up/down direction. The infant restraint system 100 can be used in such a manner that the pair of upper body belt portions 12 are mounted on either one of pairs of shoulder belt upper side mounting portions 16 in conformity with a physique of an infant who is the user of the infant restraint system 100.

The seat belt engaging portions 19 are arms which are formed on a left end portion and a right end portion of the upper portion of the back rest surface 10a and extend in the up/down direction. Upper end portions of the seat belt engaging portions 19 are configured to be swingable about a rotational axis which extends in the left/right direction. Lower end portions of the seat belt engaging portions 19 are configured to be detachably engaged with the back rest portion 10.

Each of the seat belt latching portions 20 includes a groove 20a and a pawl 20b. The grooves 20a are recessed portions which are formed on a lower portion of a corner portion where the back rest surface 10a and the left side surface 10b intersect with each other, and on a lower portion of a corner portion where the back rest surface 10a and the right side surface 10c intersect with each other, respectively. The pawl 20b extends upward from a lower surface of the recessed portion formed in the groove 20a, and an upper end of the pawl 20b forms a free end.

The back rest portion 10 is mounted with a head rest support portion 15 having a columnar shape and being formed in an upwardly projecting manner from the back rest portion 10.

Further, as shown in FIG. 3, the back rest portion 10 includes a seat portion mounting portion 25 formed on a lower end of the back rest portion 10. The seat portion mounting portion 25 is formed in a rearwardly projecting manner from the lower end of the back rest portion 10.

As shown in FIG. 2, the seat portion 9 is formed into a rectangular flat shape having a predetermined thickness, for example, and one surface of the seat portion 9 forms a seat surface 9a. The seat portion 9 includes shoulder belt lower side mounting portions 17, and a crotch belt mounting portion 40 formed at a widthwise center portion of a front edge portion of the seat portion 9.

Each of the shoulder belt lower side mounting portions 17 is a through hole, for example. The shoulder belt lower side mounting portions 17 are formed on a left portion and a right portion of the seat surface 9a, and these left and right shoulder belt lower side mounting portions 17 configure lower side position regulating portions which regulate lower side positions of the left and right shoulder belts 30 described later. The positions where the shoulder belt lower side mounting portions 17 are formed are not limited to the above-mentioned configuration. For example, the shoulder belt lower side mounting portions 17 may be formed on the back rest surface 10a at a position below the shoulder belt upper side mounting portions 16.

The crotch belt mounting portion 40 is a through hole, for example, and is a hole through which a crotch belt 34 described later is made to pass. The crotch belt mounting portion 40 is formed on the center portion of the front edge portion of the seat portion 9.

In this embodiment, although both the shoulder belt lower side mounting portion 17 and the crotch belt mounting portion 40 are the holes formed in the seat portion 9, the present invention is not limited to such a configuration.

The seat portion 9 also includes a crotch belt portion engaging mechanism 41. The crotch belt portion engaging mechanism 41 fixes a belt-shaped body 37 described later which is made to pass through the crotch belt mounting portion 40 such that the belt-shaped body 37 does not move in the length direction thereof.

A rear edge portion of the seat portion 9 is connected to a front edge portion of the seat portion mounting portion 25 such that the seat portion 9 is swingable about a rotational axis which extends in the left/right direction of the back rest surface 10a. As shown in FIG. 3, the seat portion 9 is configured to be swingable between an in-use position where at least the seat portion 9 extends toward a front side of the back rest surface 10a and a storage position where the seat portion 9 extends along the back rest surface 10a behind the back rest surface 10a. The seat surface 9a is configured such that the seat surface 9a is directed upward at the in-use position. As described previously, the seat portion mounting portion 25 is formed in a rearwardly projecting manner from the lower end of the back rest portion 10 and hence, the lower end portion of the back rest portion 10 and the seat portion 9 do not come into contact with each other when the seat portion 9 is moved toward the storage position from the in-use position. That is, the rotation of the seat portion 9 is not interrupted.

The head rest portion 11 includes a head support portion 23 which extends in the left/right direction, and a pair of side wall portions 21 which extend frontward from left and right side edges of the head support portion 23 and protects a head of an infant when a lateral collision occurs. The head support portion 23 extends in the up/down direction, and has a fitting hole 22 into which the head rest support portion 15 is fitted. The head rest support portion 15 is mounted on an upper end of the back rest portion 10 in a projecting manner, and is configured such that the relative positional relationship of the head rest portion 11 with respect to the back rest portion 10 can be adjusted using a height adjustment mechanism, not shown. Due to such a configuration, it is possible to adjust a height position of the head rest portion 11 from the seat portion 9 by moving the head rest portion 11 in the up/down direction in conformity with a physique of an infant who is the user of the infant restraint system 100.

The upper body belt portion 12 includes the pair of shoulder belts 30, a pair of tongue plates 31, and a pair of cushion shoulder pads 32.

Each of the pair of shoulder belts 30 is formed of a belt-shaped body substantially having no stretchability. Upper end portions of the pair of shoulder belts 30 are mounted on one pair of shoulder belt upper side mounting portions 16 out of two pairs of shoulder belt upper side mounting portions 16, and lower end portions of the pair of shoulder belts 30 are mounted on the pair of shoulder belt lower side mounting portions 17. In this manner, the pair of shoulder belts 30 are configured such that the pair of shoulder belts 30 respectively extend to the pair of shoulder belt lower side mounting portions 17 from the pair of shoulder belt upper side mounting portions 16. In this embodiment, the shoulder belts 30 are mounted such that the upper end portions of the shoulder belts 30 are made to pass through the shoulder belt upper side mounting portions 16 and hence, the positions of the upper end portions of the shoulder belts 30 are regulated. Further, the shoulder belts 30 are mounted such that the lower end portions of the shoulder belts 30 are made to pass through the shoulder belt lower side mounting portions 17 and hence, the positions of the lower end portions of the shoulder belts 30 are regulated. Accordingly, the upper ends of the pair of shoulder belts 30 are positioned on a back surface of the back rest portion 10, and the lower ends of the pair of shoulder belts 30 are positioned on the back surface of the seat portion 9. Further, the lower ends of the pair of shoulder belts 30 positioned on the back surface of the seat portion 9 are connected to each other. That is, in this embodiment, the pair of shoulder belts 30 are respectively formed of a part of one belt-shaped body which extends from the upper end of one shoulder belt upper side mounting portion 16 to the upper end of the other shoulder belt upper side mounting portion 16 via the pair of shoulder belt lower side mounting portions 17.

Mounting of the shoulder belts 30 on the back rest portion 10 is not limited to the above-mentioned configuration. For example, plate-shaped latching jigs may be mounted on upper end portions and lower end portions of the pair of shoulder belts 30, respectively, and the latching jigs may be engaged with holes formed in the shoulder belt upper side mounting portions 16 and the shoulder belt lower side mounting portions 17 respectively in a latching manner.

The tongue plate 31 includes an engaging portion 31a which is detachably engaged with a buckle body 35 described later and an insertion hole 31b described later. The pair of shoulder belts 30 are respectively made to pass through the insertion holes 31b formed in the pair of tongue plates 31, and the pair of tongue plates 31 are respectively mounted on the pair of shoulder belts 30. Accordingly, the tongue plate 31 is slidable in the direction that the shoulder belt 30 extends. Due to such a configuration, the position of the tongue plate 31 in the direction that the shoulder belt 30 extends can be adjusted in conformity with a physique of an infant who is the user of the infant restraint system.

The pair of cushion shoulder pads 32 are mounted on upper portions of the respective shoulder belts 30, for example. The cushion shoulder pad 32 is formed into a cylindrical shape, and the shoulder belt 30 is made to pass through the inside of the cushion shoulder pad 32. The cushion shoulder pad 32 is made of a raw material having cushioning property such as foamed urethane or the like. The cushion shoulder pad 32 can disperse an impact on a body of an infant who is the user of the infant restraint system when a collision accident occurs. Further, also during a normal travel of a vehicle, the cushion shoulder pads 32 can alleviate a fastening feeling.

As shown in FIGS. 2 and 3, the crotch belt portion 13 includes a crotch belt 34, a buckle body 35, and a cushion crotch pad 36.

The crotch belt 34 is formed of a belt-shaped body 37 substantially having no stretchability, and is formed such that the crotch belt 34 extends from the crotch belt mounting portion 40. In this embodiment, the crotch belt 34 is configured such that the belt-shaped body 37 which is folded at an intermediate portion thereof is made to pass through the crotch belt mounting portion 40 in a state where the folded portion of the crotch belt 34 is positioned above the seat surface 9a. Accordingly, the folded portion of the belt-shaped body 37 forms a distal end portion of the crotch belt 34, and this portion is made to pass through the insertion hole formed in a lower end portion of the buckle body 35.

As shown in FIGS. 2 and 3, one end portion of the belt-shaped body 37 is pulled out from a front edge portion of the seat portion 9. The portion of the belt-shaped body 37 pulled out from the front edge portion of the seat portion 9 is engaged with the seat portion 9 by the crotch belt portion engaging mechanism 41. When the crotch belt portion engaging mechanism 41 which engages the belt-shaped body 37 is released, the belt-shaped body 37 can be moved in the longitudinal direction of the seat portion 9.

Further, as shown in FIG. 3, the portion of the belt-shaped body 37 which extends toward the other end portion of the belt-shaped body 37 from the crotch belt mounting portion 40 extends from the crotch belt mounting portion 40 through a back surface side of the back rest portion 10 and the seat portion 9. The other end portion of the belt-shaped body 37 is connected to upper end portions of the pair of shoulder belts 30 positioned on a back surface of the back rest portion 10.

Accordingly, by temporarily releasing the crotch belt portion engaging mechanism 41 which engages the belt-shaped body 37 and by adjusting a length of the portion of the belt-shaped body 37 pulled out from the front edge portion of the seat portion 9, it is possible to adjust not only a length of the crotch belt 34 but also lengths of the pair of shoulder belts 30 connected to the belt-shaped body 37. Due to such a configuration, the length of the crotch belt 34 and the lengths of the pair of shoulder belts 30 can be adjusted in conformity with a physique of an infant who is a user of the infant restraint system. A release operation of the belt-shaped body 37 engaged with the seat portion 9 by the crotch belt portion engaging mechanism 41 is performed by a release button 41a mounted on the front edge portion of the seat portion 9. That is, when a user pushes down a release button 41a, the engagement of the belt-shaped body 37 by the crotch belt portion engaging mechanism 41 is released. Then, when the user releases the release button 41a which the user pushes down, the belt-shaped body 37 is engaged with the seat portion 9. The configuration of the crotch belt 34 is not limited to the above-mentioned configuration. For example, a proximal end portion of the crotch belt 34 may be fixed to the seat portion 9 or the back rest portion 10.

The buckle body 35 is configured to be detachably engaged with the engaging portions 31a of the tongue plates 31 of the pair of shoulder belts 30. The buckle body 35 includes a latch mechanism, not shown, and the engagement and disengagement of the pair of tongue plates 31 are performed by the latch mechanism. That is, to make the pair of tongue plates 31 engage with the buckle body 35, each of the pair of tongue plates 31 is inserted into the buckle body 35 so that the pair of tongue plates 31 are engaged with the buckle body 35 by the latch mechanism. On the other hand, to remove the pair of tongue plates 31 from the buckle body 35, the release button 35a is pushed so that the latch mechanism is released. Then, by pulling out the pair of tongue plates from the buckle body 35, the pair of tongue plates 31 can be removed from the buckle body 35. An insertion hole, not shown, which allows the belt-shaped body 37 to pass therethrough is formed in a lower end portion of the buckle body 35.

The buckle body 35 and the pair of tongue plates 31 have the configurations used in well-known seat belts, for example, and hence, the further description of these parts is not given here.

The cushion crotch pad 36 is a cover which covers a distal end portion of the crotch belt 34 which extends from the seat surface 9a and a back surface of the buckle body 35. The cushion crotch pad 36 is made of a raw material having cushioning property such as foamed urethane or the like, for example. Accordingly, the cushion crotch pad 36 is configured to disperse an impact on a body of an infant who is the user of the infant restraint system when a collision accident occurs. Further, the cushion crotch pad 36 can alleviate fastening feeling even at the time of normal travel of a vehicle.

The side guard portion 14 includes a pair of side plates 45 having a predetermined thickness, for example, and the pair of side plates 45 are formed in a frontwardly extending manner from the left side surface 10b and the right side surface 10c of the lower portion of the back rest portion 10, respectively. That is, the side guard portion 14 is configured to be positioned on both sides of a waist of the user when the user is seated on the seat surface 9a of the seat portion 9 positioned at the in-use position.

The side guard portion 14 is positioned above the seat portion 9 positioned at the in-use position. That is, the side guard portion 14 is disposed on an imaginary rotational trajectory of the seat portion 9 which rotates about the above-mentioned rotational axis.

[Examples of Use]

Next, an example of the use of the infant restraint system 100 according to this embodiment is described.

Figure 4:
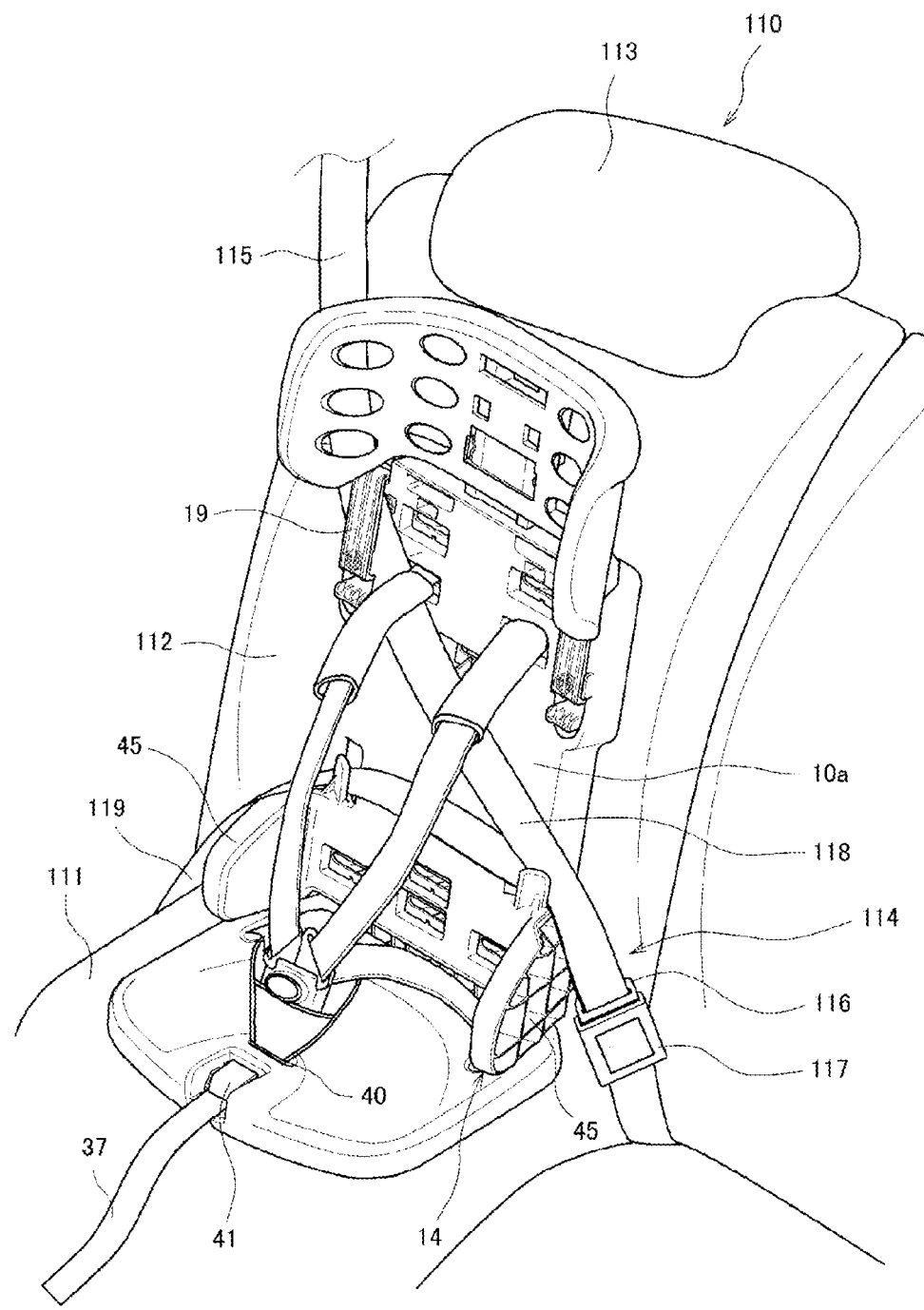
FIG. 4 is a perspective view showing an example of the use of the infant restraint system shown in FIG. 1.
Figure 5:
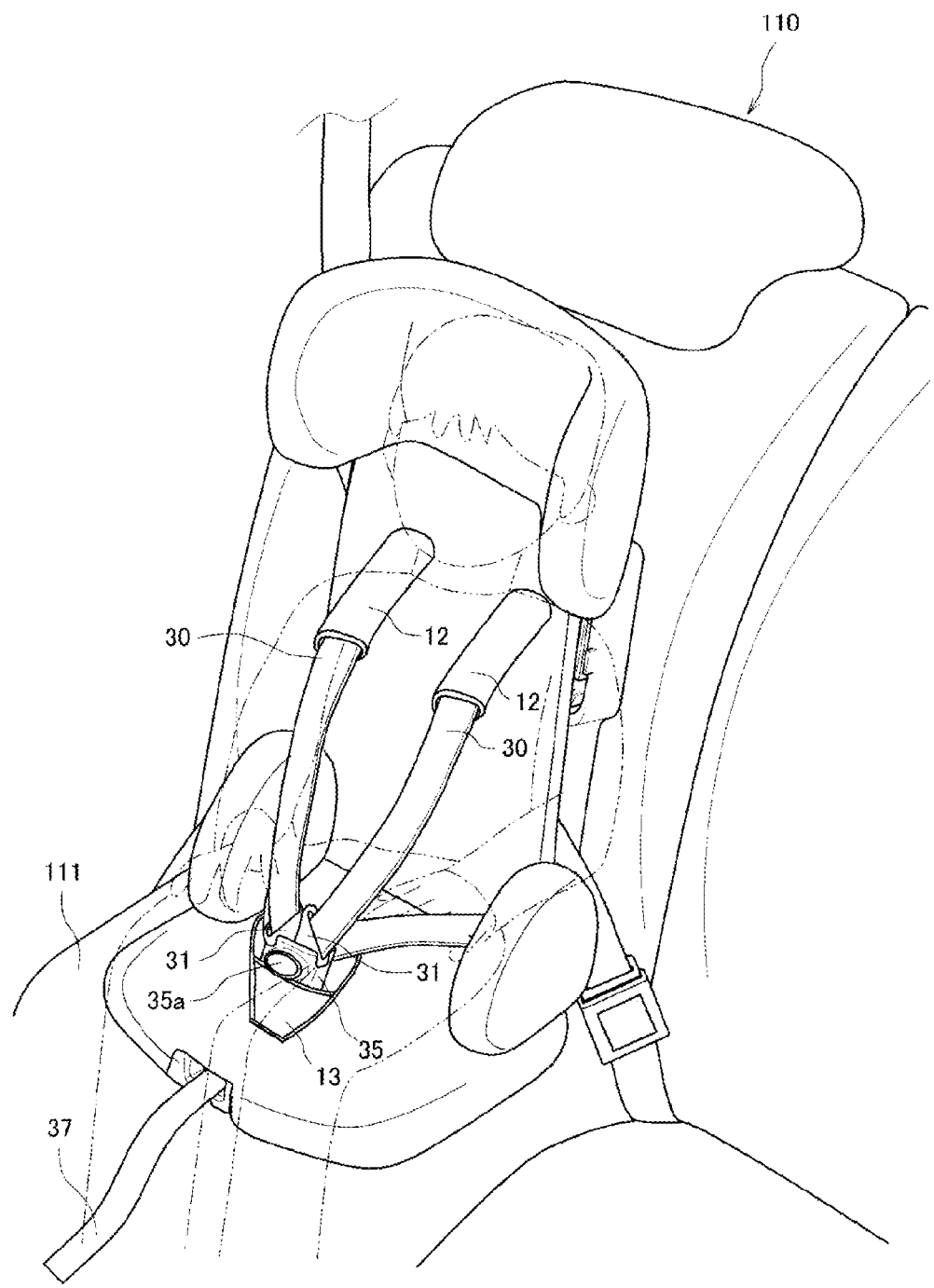
FIG. 5 is a perspective view showing an example of the use of the infant restraint system shown in FIG. 1.

FIG. 4 is a perspective view showing the example of the use of the infant restraint system 100. FIG. 4 also shows a state where the infant restraint system 100 with the cover 2 removed therefrom is mounted on the vehicle seat 110. FIG. 5 is a perspective view showing the example of the use of the infant restraint system 100. FIG. 5 also shows a state where the infant restraint system 100 mounted with the cover 2 is mounted on the vehicle seat 110.

The vehicle seat 110 on which the infant restraint system 100 according to the embodiment of the present invention is mounted includes, as shown in FIG. 4, a seat portion 111, a back portion 112 which extends upward from a rear end of the seat portion 111, a head rest 113 mounted on an upper end portion of the back portion 112, and a seat belt 114.

The seat belt 114 is a so-called three-point seat belt. The seat belt 114 includes: a strap 115 which extends in the vertical direction on a side of the vehicle seat in a storage state; a winding mechanism, not shown, which winds up an upper end portion of the strap 115; a tongue plate 116 which is attached to the strap 115 in an inserted manner; and a buckle 117 which is disposed in the vicinity of a boundary between a rear edge portion of the seat portion 111 of the vehicle seat 110 and a base portion of the back portion 112 of the vehicle seat 110, and is configured to be detachably engaged with the tongue plate 116. A lower end of the strap 115 is fixed to a vehicle. By making the tongue plate 116 engage with the buckle 117, an upper body support portion 118 which extends to the winding mechanism from the tongue plate 116, and a waist support portion 119 which extends to a lower end of the strap 115 from the tongue plate 116 are formed.

In mounting the infant restraint system 100 on the vehicle seat 110, firstly, the cover 2 is removed.

Then, the seat portion 9 of the infant restraint system 100 is positioned at the in-use position.

Next, the seat portion 9 is placed on the seat portion 111 of the vehicle seat 110, and the infant restraint system 100 is positioned such that the back rest surface 10a of the back rest portion 10 extends along the back portion 112 of the vehicle seat 110.

Then, the tongue plate 116 is engaged with the buckle 117.

Next, either one of left and right seat belt engaging portions 19 is lifted by rotating the seat belt engaging portion 19, and the upper body support portion 118 of the seat belt 114 is positioned between the seat belt engaging portion 19 and the back rest surface 10a. Then, a lower end portion of the seat belt engaging portion 19 and the back rest portion 10 are engaged with each other, thus sandwiching the seat belt 114 between the seat belt engaging portion 19 and the back rest portion 10.

Next, the waist support portions 119 of the seat belt 114 are latched to the pawls 20b of the left and right seat belt lathing portions 20 respectively. Further, the upper body support portion 118 of the seat belt 114 on a side where the tongue plate 116 is positioned is latched to the pawl 20b of the seat belt latching portion 20.

Next, the cover 2 is mounted on the infant restraint system body 1. The infant restraint system 100 can be mounted on the vehicle seat 110 in this manner.

In restraining an infant who is the user by the infant restraint system 100, as shown in FIG. 5, firstly, the infant is seated on the seat portion 111 of the vehicle seat 110 such that the crotch belt portion 13 passes between both his or her thighs. Then, arms of the infant are made to pass through the left and right upper body belt portions 12, and the engaging portions 31a of the pair of tongue plates 31 (see FIG. 2) and the buckle body 35 are engaged with each other. Then, the length of the crotch belt 34 and the length of the shoulder belt 30 are adjusted by pushing the release button 41a of the crotch belt portion engaging mechanism 41. The infant seated on the seat portion 111 of the vehicle seat 110 is restrained by the infant restraint system 100 mounted on the vehicle seat 110 in this manner.

As described above, in a state where the infant is restrained by the vehicle seat 110, the pair of side plates 45 of the side guard portion 14 are positioned on both sides of the waist of the infant. Accordingly, for example, when an impact is applied to the infant restraint system 100 from a side due to a side collision accident so that a body of the infant is almost thrown out sideways, the side guard portion 14 supports the waist of the infant, thus preventing the body of the infant from being thrown out sideways. Accordingly, the infant restraint system 100 can protect the infant from the impact coming from a side.

Further, the side guard portion 14 is disposed on the imaginary rotational trajectory of the seat portion 9 which rotates about the above-mentioned rotational axis. Accordingly, when the back rest portion 10 rotates frontward, the side guard portion 14 is brought into contact with the seat portion 9 so that the rotation of the back rest portion 10 is restricted by the side guard portion 14 whereby the infant restraint system 100 is not foldable. Accordingly, it is possible to prevent the occurrence of a case where the infant restraint system 100 becomes folded when a head-on collision accident occurs so that the infant is sandwiched between the back rest portion 10 and the seat portion 9.

Next, in removing the infant restraint system 100 from the vehicle seat 110, the release button 35a of the buckle body 35 is pushed so that the latch mechanism of the buckle body 35 is released. Then, the user pulls out the engaging portions 31a of the pair of tongue plates 31 from the buckle body 35. Accordingly, the restraint of the infant is released.

Next, the infant is put down from the vehicle seat 110, and the upper body support portion 118 and the waist support portion 119 of the seat belt 114 are disengaged from the pawls 20b of the seat belt latching portions 20. Then, the seat belt engaging portion 19 is lifted by rotating the seat belt engaging portion 19 thus removing the seat belt 114 engaged with the back rest portion 10. Then, the engagement between the tongue plate 116 of the vehicle seat 110 and the buckle 117 is released, and the tongue plate 116 is pulled out from the buckle 117. Accordingly, the strap 115 is wound by and stored in the winding mechanism.

Then, the infant restraint system 100 is put down from the vehicle seat 110, and the seat portion 9 positioned at the in-use position is swung toward the storage position. Accordingly, the infant restraint system 100 can be folded in a compact manner.

As has been described heretofore, in the infant restraint system 100 of this embodiment, in a state where the infant is restrained by the vehicle seat 110, the pair of side plates 45 of the side guard portion 14 are positioned on both sides of the waist of the infant. Accordingly, for example, when an impact is applied to the infant restraint system 100 from a side due to a side collision accident so that a body of the infant is almost thrown out sideways, the side guard portion 14 supports the waist of the infant, thus preventing the body of the infant from being thrown out sideways. Accordingly, it is possible to protect the infant from an impact coming from a side.

Further, in a state where the infant restraint system 100 is mounted on the vehicle seat 110, when the back rest portion 10 is rotated frontward, the side guard portion 14 is brought into contact with the seat portion 9 so that the rotation of the back rest portion 10 is restricted by the side guard portion 14. Accordingly, for example, it is possible to prevent the occurrence of a case where the infant restraint system 100 becomes folded when a head-on collision accident occurs so that the infant is sandwiched between the back rest portion 10 and the seat portion 9.

Further, by positioning the seat portion 9 at the storage position, the length size of the infant restraint system 100 in the longitudinal direction can be decreased. Accordingly, the infant restraint system 100 can be folded in a compact manner and hence, it is possible to save a storage space for storing the infant restraint system 100 after having removed from the vehicle seat 110. Further, such structure is also advantageous in portability.

From the above-mentioned description, it is apparent to those skilled in the art that various improvements and other embodiments of the present invention can be made. Accordingly, it should be construed that the above-mentioned description is made only for exemplifying the present invention, and is provided for disclosing the best mode for carrying out the present invention to those skilled in the art. The detail of the structure and/or the functions of the present invention can be substantially changed without departing from the gist of the present invention.

INDUSTRIAL APPLICABILITY

The present invention is usefully applicable to a riding device of a vehicle.

REFERENCE CHARACTER LIST 1 infant restraint system body
2 cover
9 seat portion
9a seat surface
10 back rest portion
10a back rest surface
10b left side surface
10c right side surface
11 head rest portion
12 upper body belt portion
13 crotch belt portion
14 side guard portion
15 head rest support portion
16 shoulder belt upper side mounting portion
17 shoulder belt lower side mounting portion
18 crotch belt engaging portion
19 seat belt engaging portion
20 seat belt lathing portion
20a groove
20b pawl
21 side wall portion
22 fitting hole
23 head support portion
25 seat portion mounting portion
30 shoulder belt
31 tongue plate
31a engaging portion
31b insertion hole
32 cushion shoulder pad
34 crotch belt
35 buckle body
35a release button
36 cushion crotch pad
37 belt-shaped body
40 crotch belt mounting portion
41 crotch belt portion engaging mechanism
41a release button
45 side plate
50 crotch belt
51 cushion crotch pad
100 infant restraint system
110 vehicle seat
111 seat portion
112 back portion
113 head rest
114 seat belt
115 strap
116 tongue plate
117 buckle
118 upper body support portion
119 waist support portion

The invention claimed is:

1. An infant restraint system which is mounted on a vehicle seat having a seat portion and a back portion, the infant restraint system comprising:
a back rest portion disposed along the back portion of the vehicle seat and having a back rest surface which extends in a vertical direction;
the seat portion being configured such that the seat portion is connected to a lower portion of the back rest portion swingably between an in-use position and a storage position, extends toward a front side of the back rest surface at the in-use position, and extends along the back rest surface behind the back rest surface at the storage position;
upper side position regulating portions for regulating upper side positions of a pair of shoulder belts, the upper side position regulating portions being formed on a left portion and a right portion of an upper portion of the back rest surface respectively;
lower side position regulating portions for regulating lower side positions of the pair of shoulder belts, the lower side position regulating portions being formed on a left portion and a right portion of the back rest surface at a position below the upper side position regulating portions respectively or a left portion and a right portion of the seat portion respectively;
an upper body belt portion which includes the pair of shoulder belts extending from the upper side position regulating portions to the lower side position regulating portions, and a pair of tongue plates which are respectively attached to the pair of shoulder belts in a state where the pair of shoulder belts are allowed to pass through the pair of tongue plates, respectively;
a side guard portion including a pair of side plates, wherein one of the pair of side plates extends frontward in a state in which a rear end portion of one of the pair of side plates is directly fixed to and mounted on a left edge portion of the lower portion of the back rest portion, and the other of the pair of side plates extends frontward in a state in which a rear end portion of the other of the pair of side plates is directly fixed to and mounted on a right edge portion of the lower portion of the back rest portion, wherein each of the pair of side plates has a lower edge that is adjacent to the seat portion throughout a lower edge forward extent in the in-use position, the lower edge forward extent is one third or greater of a depth of the seat portion in the in-use position, and a vertical extent is one third or less of a height of the back rest portion, and wherein each of the pair of side plates is not directly coupled to the seat portion, and an intermediate portion of an upper edge of each of the side plates is inclined forward and obliquely downward; and
a crotch belt portion extending from a crotch belt mounting portion mounted on a center portion of a front edge portion of the seat portion, and having a buckle body which is detachably engaged with the pair of tongue plates on a distal end portion thereof,
wherein the seat portion has a rear edge portion thereof swingably connected to a lower portion of the back rest portion about a rotational axis extending in a left/right direction, and
wherein the side guard portion is disposed above the seat portion positioned at the in-use position and on a rotational trajectory of the seat portion which rotates about the rotational axis.

2. The infant restraint system according to claim 1, wherein
at least one of a length of at least one of the upper body belt portion and a length of the crotch belt portion is configured to be adjustable.

* * * * *